United States Patent
Hodel-Widmer

(10) Patent No.: US 7,912,811 B2
(45) Date of Patent: Mar. 22, 2011

(54) COMPUTER-BASED SYSTEM AND COMPUTER PROGRAM PRODUCT FOR COLLABORATIVE EDITING OF DOCUMENTS

(75) Inventor: Thomas B. Hodel-Widmer, Flurlingen (CH)

(73) Assignee: Universitaet Zuerich, Zuerich (CH)

( * ) Notice: Subject to any disclaimer, the term of this patent is extended or adjusted under 35 U.S.C. 154(b) by 1158 days.

(21) Appl. No.: 11/596,798

(22) PCT Filed: May 17, 2005

(86) PCT No.: PCT/IB2005/001462
§ 371 (c)(1),
(2), (4) Date: Nov. 17, 2006

(87) PCT Pub. No.: WO2005/114467
PCT Pub. Date: Dec. 1, 2005

(65) Prior Publication Data
US 2008/0072141 A1 Mar. 20, 2008

Related U.S. Application Data

(60) Provisional application No. 60/572,563, filed on May 19, 2004.

(51) Int. Cl.
*G06F 17/20* (2006.01)
*G06F 17/24* (2006.01)
(52) U.S. Cl. .................................. 707/608; 707/756
(58) Field of Classification Search .................. 707/608, 707/609, 736, 755, 756, 791, 800, 803, 999.001
See application file for complete search history.

(56) References Cited

U.S. PATENT DOCUMENTS

2006/0190423 A1* 8/2006 Tanaka et al. ................. 707/1

OTHER PUBLICATIONS

Using Database Management Systems for collaborative text editing, Thomas B. Hodel et al., pp. 1-4.*
Hodel et al.: Using Database Management Systems for Collaborative Text Editing; ACM European Conference on Computer-Supported Cooperative Work, 2003, Helsinki, FI XP-002386113 Retrieved from the Internet:: URL: http://www.tendax.net/index.php?option=com_docman&task=doc_download&gid=17&Itemid=79> Retrieved on Jun. 16, 2006.
Newman-Wolfe. et al.: "MACE: a fine grained concurrent editor"; SIGOIS Bulletin USA, vol. 12, No. 2-3, 1991, pp. 240-254 XP-002386114 ISSN: 0894-0819.

(Continued)

*Primary Examiner* — Angela M Lie
(74) *Attorney, Agent, or Firm* — Laurence A. Greenberg; Werner H. Stemer; Ralph E. Locher

(57) ABSTRACT

A computer-based system for collaborative editing of documents has a computer-based control module and computerized workstations. The system has a database connected to the control module that stores a document in the database as linked character objects. Each character object represents one particular character of the document, includes a unique object identifier, and represents a type of the particular character. The character object represents the particular character being linked to a first character object representing a character preceding directly the particular character in the document and to a second character object representing a character following directly the particular character in the document. The control module receives and processes editing commands. The system has a propagation module for transmitting propagation messages to the workstations participating in the collaborative editing of the document, propagation messages including the character objects inserted or deleted in the database.

20 Claims, 3 Drawing Sheets

OTHER PUBLICATIONS

Chengzheng et al.: "REDUCE: a prototypical cooperative editing system"; Design of Computing Systems: Cognitive Considerations. Proceedings of the Seventh International Conference on Human-Computer Interaction (HCI International '97) Elsevier Amsterdam, Netherlands vol. 1, 1997, pp. 89-92 vol. 1, XP-008065414 ISBN: 0-444-82183-X cited in the application.

* cited by examiner

COMPUTER-BASED SYSTEM AND COMPUTER PROGRAM PRODUCT FOR COLLABORATIVE EDITING OF DOCUMENTS

BACKGROUND OF THE INVENTION

The present invention relates to a computer-based system and a computer program product for collaborative editing of documents. Specifically, the present invention relates to a computer-based system for collaborative editing of documents, the computer-based system comprising a computer-based control module and a plurality of computerized workstations connected to the control module via communication channels, the control module being based on a computer having one or more processors controlled by the computer program product.

Conventionally, computer-based systems for editing of documents comprise one or more computerized workstations connected via communication channels to a file server. The computerized workstations, typically personal computers, run an editing program, either locally or on an application server, for editing a document selected and loaded from the file server. In collaborative editing more than one user edit concurrently the same document. In known systems for collaborative editing of documents, changes to the documents and the positions of the changes are communicated from the workstation where the change has been initiated to all the other workstations that have loaded and opened the same document file. Such a system for collaborative editing has been described by Sun., C., Jia, X., Zhang, Y., and Yang, Y.: "REDUCE: a prototypical cooperative editing system", in Proceedings of the Human-Computer Interaction, 1997, pages 89-92. The system described by Sun., C., Jia, X., Zhang, Y., and Yang, Y makes possible collaborative editing of document files via the Internet. While the known systems for collaborative editing of documents make possible concurrent editing of document files by multiple users, security and access control mechanisms always apply to the whole document file. In other words, in the known systems for collaborative editing, all the participating users have the same access rights for the whole document file. The known systems for collaborative editing of documents make possible simultaneous editing of a document file but fail to provide control over who edited what part of the document, how the document was created or from where document parts were copied.

SUMMARY OF THE INVENTION

It is an object of this invention to provide for collaborative editing of documents a computer-based system and a computer program product, which do not have the disadvantages of the prior art. In particular, it is an object of the present invention to provide for collaborative editing of documents a computer-based system and a computer program product, which make possible security mechanisms within a document, i.e. security or access control are applicable to parts of a document. It is a further object of the present invention to provide for collaborative editing of documents a computer-based system and a computer program product, which make possible efficient editing avoiding time delays noticeable to a user between entry and display of editing operations.

According to the present invention, these objects are achieved particularly through the features of the independent claims. In addition, further advantageous embodiments follow from the dependent claims and the description.

According to the present invention, the above-mentioned objects are particularly achieved in that a computer-based system for collaborative editing of documents comprises a database connected to a control module, and in that the control module is designed for storing a document in the database as a plurality of linked character objects, each character object representing one particular character of the document, each character object including a unique object identifier and a character code representing a type of the particular character, the character object representing the particular character being linked to a first character object representing a character preceding directly the particular character in the document and to a second character object representing a character following directly the particular character in the document. The control module is designed to receive and process editing commands from a plurality of workstations connected to the control module via communication channels. Editing commands for inserting or deleting characters are mapped by the control module onto database transactions for inserting or deleting character objects in the database and for re-linking in the database the character objects representing characters preceding or following directly inserted or deleted characters. The system comprises a propagation module for transmitting propagation messages to the workstations participating concurrently in the collaborative editing of the same document, propagation messages including the character objects inserted or deleted in the database. Storing each character of a document as a separate character object in a database has the advantage that various characteristics can be assigned to each character of the document as additional data elements of the respective character object. For example, it is possible to assign security and access control criteria at the character level of a document. Moreover, storing characters as character objects in a database makes it possible to use common database features such as transaction control or locking mechanisms for collaborative editing of documents. Linking each character object to the character object representing the preceding character and to the character object representing the subsequent character makes it possible to locate very efficiently characters of a document. Moreover, the double link of the character objects makes it possible to reflect insertion or deletion of characters very easily and efficiently in the database. For example, on a conventional 2.4 GHz personal computer, the database transactions for inserting a character (object) in the database, including data integrity checks and index updates, takes less than 0.3 milliseconds.

Preferably, the control module is designed to map an editing command for inserting a new character between a preceding character and a subsequent character onto database transactions for inserting a new character object in the database, the new character object being linked to the character object representing the preceding character and to the character object representing the subsequent character, for linking the character object representing the preceding character to the new character object, and for linking the character object representing the subsequent character to the new character object. The control module is designed to map an editing command for deleting one or more characters between the preceding character and the subsequent character onto database transactions for linking the character object representing the preceding character to the character object representing the subsequent character and for linking the character object representing the subsequent character to the character object representing the preceding character. Preferably, for linking the character objects, each character object representing a particular character of the document includes a backward pointer, referencing a character object representing a character preceding directly the particular character in the document, and a forward pointer, referencing a character object representing a character following directly the particular character in the document. Thus, for inserting a new character between a preceding character and a subsequent character, a new character object is inserted in the database, the forward pointer of the new character object is set to reference the character object representing the subsequent character, the backward pointer of the new character object is set to reference the character object representing the preceding character, the backward pointer of the character object representing the subsequent character is set to reference the new character object, and the forward pointer of the character object representing the preceding character is set to reference the new character object. For deleting one or more characters, the backward pointer of the character object representing the subsequent character is set to reference the character object representing the preceding character, and the forward pointer of the character object representing the preceding character is set to reference the character object representing the subsequent character.

Preferably, the workstations each include means for storing object identifiers reserved in the database. The workstations each include an editor module designed to display a new character entered by a user, to assign to the new character an object identifier stored in the respective workstation, and to transmit to the control module an editing command for inserting the new character. The editing command includes the object identifier assigned to the new character and the character code representing the type of the new character. The control module is designed to map the editing command for inserting the new character onto a database transaction for inserting into the database a new character object, the new character object including the object identifier and the character code received in the editing command, and for re-linking in the database the character objects representing characters preceding or following directly the new character in the document. Storing reserved object identifiers in the workstations and inserting new character objects in the database using the stored objects identifiers has the advantage that the workstation does not need to wait for the database to report object identifiers assigned to inserted character objects. Without waiting for an object identifier to be reported by the database, the workstation can display a new character entered by the user and represented by the new character object. Thus, editing of the document may proceed without any time delays noticeable to the user.

Preferably, the system includes means to lock in the database the character objects representing characters preceding and following directly deleted or inserted characters when executing database transactions associated with inserting or deleting characters. Locking character objects representing characters preceding or following directly deleted or inserted characters has the advantage that insertion and deletion of character objects can be executed as atomic actions, not interrupted or disturbed by other database operations affecting the same character objects. Thus data integrity of the document can be maintained.

In an embodiment, the control module is designed to map an editing command for setting a particular attribute for a defined zone of one or more characters of the document onto database transactions for storing in the database a zoning object, the zoning object including the particular attribute or a pointer to an attribute object including the particular attribute, and for linking the character objects representing the characters located at the beginning and at the end of the defined zone to the zoning object. For example, in the character objects representing the characters located at the beginning and at the end of the defined zone, a zone border identifier is set, and in the database, information linking the zone border identifiers to the zoning object is stored. Linking to zone attributes the character objects, representing the characters located at the beginning and at the end of a defined zone, has the advantage that the attributes can be set with the same number of database operations independently from the number of characters included in the zone.

In various embodiments, the particular attribute includes formatting information, access control information, and/or workflow control information for a defined zone of one or more characters of the document. Formatting information such as character size, font type, or character style enable flexible and efficient formatting of user selected zones of a document. Access control information makes it possible to restrict a defined zone of the document to selected users and/or editing operations. Workflow control information makes it possible to define a sequence of workflow steps or phases according to which specified users must edit defined zones at specific stages in the creation of the document.

The workstations each include an editor module for loading from the database the character objects representing the characters of the document. Each character object is assigned a position by the editor module, a starting position being assigned to the character object representing a first character of the document and subsequent positions being assigned to the remaining character objects based on links between the character objects. In an embodiment, the editor module is designed to transmit to the control module, in response to an editing operation performed by a user, an editing command including an editing position, the editing position corresponding to the position assigned to the character object representing the character in the document where the editing operation is applied. The propagation module is designed to include in the propagation messages the editing position received from the editor module and the editor module is designed to locate the character object where an editing operation is to be applied based on the editing position received in a propagation message. Propagating the editing position to other workstations participating concurrently in the collaborative editing of a document makes it more efficient for the participating workstations to locate the character objects where the editing operation is to be applied.

In an embodiment, the editing commands include a user identification, and the control module is designed to store automatically in the database a log of editing commands mapped onto transactions committed to the database, the log including the user identification and time information. Logging automatically user and time of editing commands committed to the database has the advantage that a very detailed chronological account of the creation of a document can be produced. In addition to the user identification, data source information can be included in the editing commands for inserting one or more characters so that the source of every character object in the document can be logged and a later point in time provided in a report. For example, the source information includes a URL address (Uniform Resource Locator), a document identifier, or an object identifier for indicating the source of one or more copied and inserted characters.

The present invention also relates to a computer program product for editing of documents, the computer program product comprising computer program code means for controlling one or more processors of a computer such that it performs the functions of the control module as described above.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
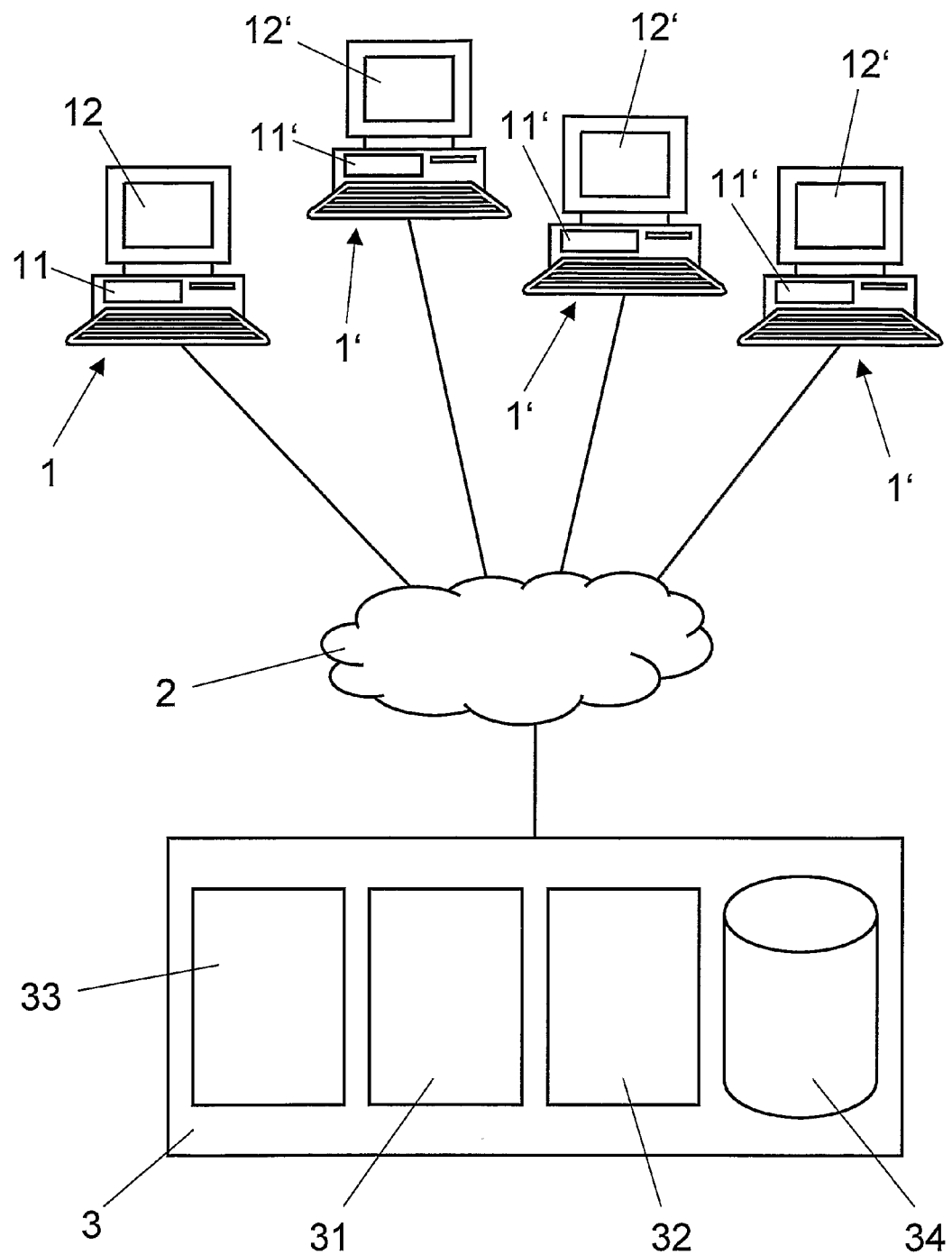
FIG. 1 shows a block diagram illustrating schematically an exemplary configuration of a system for collaborative editing.

In FIG. 1, the reference numerals 1, 1' refer to workstations connected via communication network 2 to computer system 3. The workstations 1, 1' are for example personal computers (PC), e.g. desktop, laptop, or notebook models, digital assistants (PDA), or mobile radio phones. The communication network 2 includes, for example, fixed networks and wireless networks. For example the communication network 2 includes a local area network (LAN), an integrated services digital network (ISDN), the Internet, a global system for mobile communication (GSM), a universal mobile telephone system (UMTS) or another mobile radio telephone system, and/or a wireless local area network (WLAN). The computer system 3 comprises one or more computers. As is illustrated schematically in FIG. 1, the computer system 3 includes a propagation module 31, a control module 32, a network module 33, and a database 34. The propagation module 31, the control module 32, the network module 33, and the database 34 are implemented preferably as computer program products stored in memory of the computer system 3 or on a data carrier insertable in and connectable to the computer system 3. The modules of the computer system 3 can be installed on one common or on separate computers. For example, the propagation module 31 is implemented on a separate real-time server, the control module 32 is implemented on a separate application server, the network module 33 is implemented on a separate web server, and the database 34 is implemented on a separate database server. Preferably, the database 34 includes a database management system. The network module 33 is designed to handle and control remote login of users connecting to the computer system 3 with their workstations 1, 1' via the communication network 2. The workstations 1, 1' are designed to communicate, i.e. to exchange data, with modules of computer system 3 via communication channels through the communication network 2. The expert will understand that there can be multiple instances of the modules of the computer system 3, i.e. there can be multiple distributed propagation modules 31, control modules 32, network modules 33, and databases 34. As is illustrated schematically in FIG. 1, the workstations 1, 1' each include an editor module 11 or 11', respectively. Preferably, the editor modules 11, 11' are implemented as computer program products stored in memory of the workstations 3 or on a data carrier insertable in and connectable to the workstations 1 or 1', respectively. The editor modules 11, 11' are based on conventional editors such as Microsoft Word (registered trademark by Microsoft Corporation) extended by additional functionality as described below.

In the following paragraphs, the functions of the above-mentioned modules and the steps executed by these modules are described with reference to FIG. 2.

Figure 2:
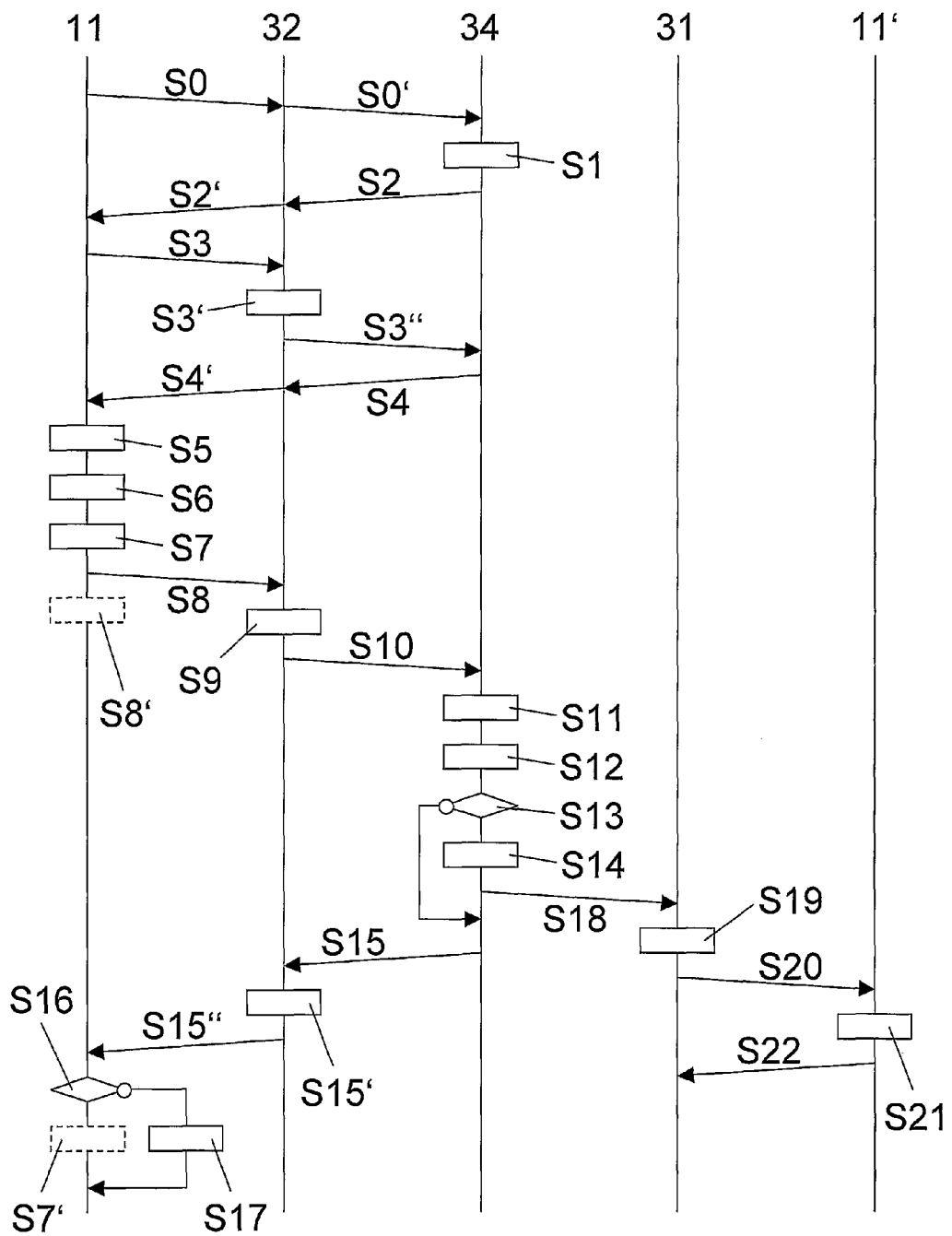
FIG. 2 shows a timing diagram illustrating an example of a sequence of steps executed in the system for collaborative editing.

As is illustrated in FIG. 2, in step S0, the editor module 11 sends a request for a set of reserved object identifiers via the communication network 2 to the control module 32. In step S0', the request from step S0 is forwarded by the control module 32 to the database 34. In step S1 the requested object identifiers are reserved in the database 34. In steps S2, S2' the reserved object identifiers are sent from the database 34 via the control module 32 and the communication network 2 to the editor module 11. In the editor module 11, the reserved object identifiers received in step S2' are stored in a data store of the workstation 1.

In step S3, the editor module 11 sends a request for a specific document to the control module 32.

Figure 3:
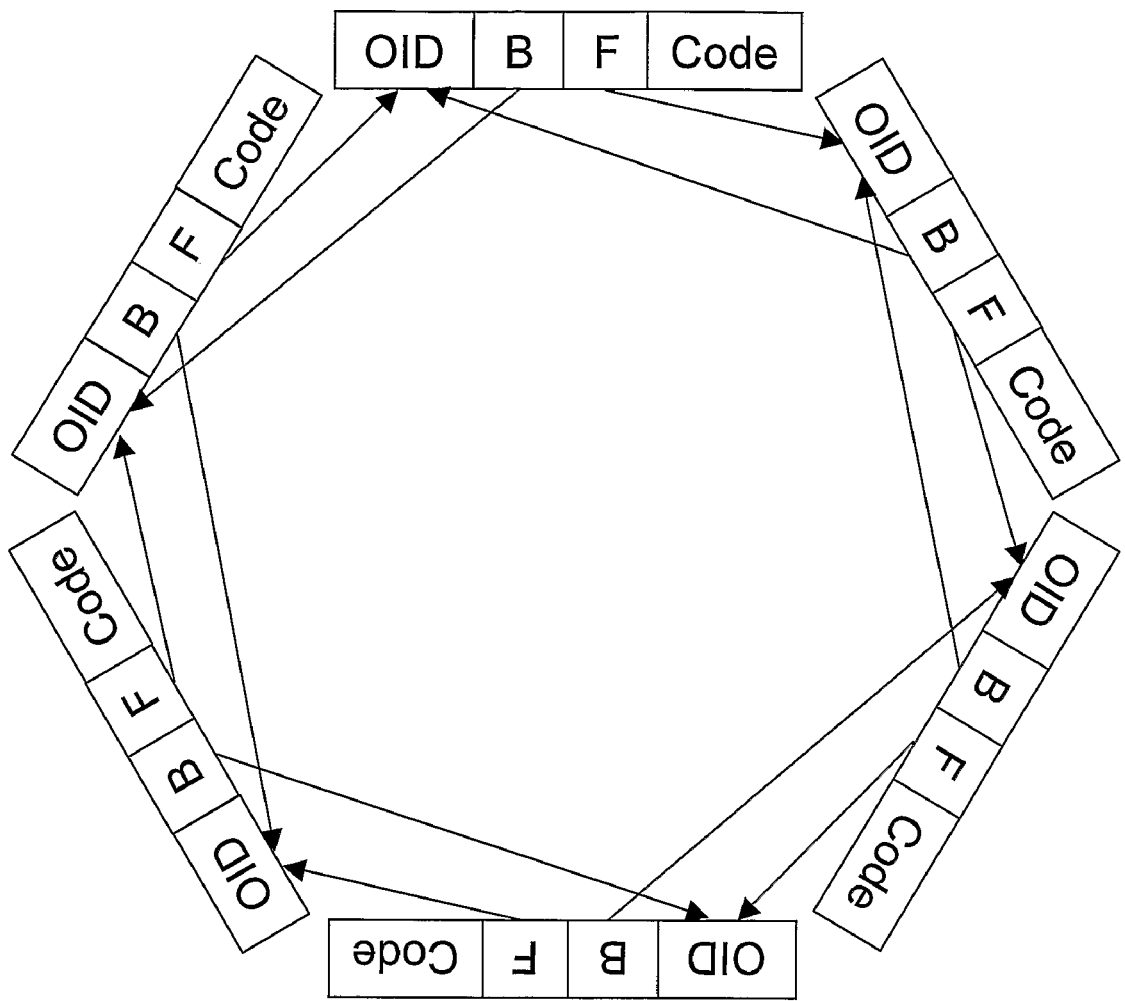
FIG. 3, shows a data diagram illustrating schematically a ring of double linked character objects representing the characters of a document.

As is illustrated schematically in Table 1, documents are stored in the database 34 as double linked character objects, each character object representing one character of the document. Table 1 illustrates a possible representation of a simple document containing the character sequence "TAI". As can be seen in Table 1, each character object representing one of the characters of the document comprises an object identifier and a character code. Moreover, each character object includes a forward pointer to the character object representing the character immediately following the particular character and a backward pointer to the character object representing the character immediately preceding the particular character. As can also be seen in Table 1, the character object ("12") representing the first character ("T") of the document is linked with a backward pointer ("19") to the character object ("19") representing the last character ("I") of the document, and the character object ("19") representing the last character ("I") of the document is linked with a forward pointer ("12") to the character object ("12") representing the first character ("T") of the document. In this way, the document is stored in the database 34 as a double linked ring of character objects. In FIG. 3, the data structure of double linked character objects for representing a document is illustrated schematically. As is illustrated in FIG. 3, each character object comprises a forward pointer F, referencing the object identifier OID of the character object representing the subsequent character, and a backward pointer B, referencing the object identifier OID of the character object representing the preceding character.

TABLE 1

| Object Identifier | Backward | Forward | Character Code |
|---|---|---|---|
| 12 | 19 | 18 | "T" |
| 18 | 12 | 19 | "A" |
| 19 | 18 | 12 | "I" |

In step S3', the control module 32 relates the name of the document requested in step S2 to the data object ("12") representing the first character ("T") of the document.

In step S3", the control module 32 maps the request from step S3 onto database transactions for retrieving from the database 34 the character objects linked to the data object ("12") determined in step S3'. In step S4, the character objects requested in step S3" are passed from the database 34 to the control module 32. In step S4', the character objects received in step S4 are transmitted from the control module 32 via the communication network 2 to the editor module 11.

In step S5, the editor module 11 assigns to each of the character objects received in step S4' an offset value. The offset value corresponds to the position in the document of the character represented by the respective character object.

Table 2 illustrates the positions assigned to the characters represented by the example of character objects shown in Table 1.

TABLE 2

| Position | Character Code | Object Identifier |
|---|---|---|
| 0 | "T" | 12 |
| 1 | "A" | 18 |
| 2 | "I" | 19 |

Thus, Table 2 illustrates an example of a possible representation of a simple document loaded from the database 34 into the editor module 11 of workstation 1. One skilled in the art will understand that there are different possibilities and data structures to represent the document loaded from the database 34 in the editor module 11. Preferably, the character codes and assigned positions are stored in a combined array together with the corresponding character objects. It is also possible to store the character codes and assigned positions in a character array and to store the character objects and assigned positions in a separate object array.

In step S6, the editor module 11 receives an edit operation from the user of workstation 1. For example, the edit operation is a request for insertion of a character entered by the user at a specific edit position in the document, a request for changing one or more specified characters in the document to one or more new character entered or copied by the user, a request for deletion of one or more characters at a specific edit position or in a specific range or zone of the document, a request for insertion of multiple copied characters at a specific edit position, or a request for setting a particular attribute for a specific range or zone of characters in the document.

Table 3 shows a possible representation of the exemplary document in the editor module 11, after insertion of a new character "X" at position 2 to form the word "TAXI". As is illustrated in Table 3, one of the reserved object identifiers ("32") stored in step S2' is assigned to the new character.

TABLE 3

| Position | Character Code | Object Identifier |
|---|---|---|
| 0 | "T" | 12 |
| 1 | "A" | 18 |
| 2 | "X" | 32 |
| 3 | "I" | 19 |

In step S7, the editor module 11 maps the edit operation received in step S6 onto a corresponding editing command. All editing commands include the type of edit operation and a user identification. For insert operations, the editing commands also include the character code of the new character and a reserved object identifier assigned to the new character. Preferably, for the purpose of data integrity checks, the editing commands for insert operations also include the object identifiers and character codes of the characters preceding and following directly the new character. If multiple copied characters are to be inserted, all their character codes and assigned reserved object identifiers are included. For delete operations, included are the object identifiers of all the character objects representing the characters to be deleted. For attribute setting operations, included are information about the particular attribute and object identifiers of the character objects representing the first and last characters of the range or zone of characters to be affected. Preferably, delete operations and attribute setting operations include the number of characters to be deleted or changed. Preferably, the editing commands also include the edit (start) position where the edit operation is to be applied in the document. Character changing operations can be mapped onto delete and insert operations.

In step S8, the editor module 11 transmits the editing command prepared in step S7 via the communication network 2 to the control module 32.

In an asynchronous mode of the editor module 11, in step S8', the effects of the edit operation received in step S6 are reflected in the local representation of the document and on the display 12 of the workstation 1. In a synchronous mode of the editor module 11, step S8' is omitted. In the synchronous mode the effects of the edit operation received in step S6 are not reflected locally in the workstation 1 until a positive confirmation concerning the execution of the edit operation in the database 34 has been received by the editor module 11 (see step S7').

In step S9, the control module 32 maps the editing command received in step S8 onto database transactions for the database 34. An editing command for inserting a new character into the document is mapped onto database transactions for inserting into the database 34 a new character object representing the new character, for linking the new character object to the character object representing the character preceding the new character and to the character object representing the character following the new character, for linking the character object representing the preceding character to the new character object, and for linking the character object representing the subsequent character to the new character object. The new character object includes the character code and the reserved object identifier received in step S8.

TABLE 4

| Object Identifier | Backward | Forward | Character Code |
|---|---|---|---|
| 12 | 19 | 18 | "T" |
| 18 | 12 | 32 | "A" |
| 19 | 32 | 12 | "I" |
| 32 | 18 | 19 | "X" |

Table 4 illustrates a possible representation by double linked character objects of the exemplary document from Table 3 with the new character "X" inserted at position "2". The new character object ("32") representing the new character "X" is linked with a backward pointer ("18") to the character object representing the character ("A") preceding the new character. Moreover, the new character object is linked with a forward pointer ("19") to the character object representing the character ("I") following the new character. The character object ("18") representing the character ("A") preceding the new character is linked with a forward pointer ("32") to the character object representing the new character. The character object ("19") representing the character ("I") following the new character is linked with a backward pointer ("32") to the character object representing the new character.

An editing command for inserting a sequence of multiple copied characters into the document is mapped by the control module onto database transactions for inserting into the database 34 new double linked character objects representing the sequence of new characters, for linking the new character object representing the first of the new characters to the character object representing the character preceding the first of the new characters, for linking the new character object representing the last of the new characters to the character object representing the character following the last of the new characters, for linking the character object representing the character preceding the first of the new characters to the character object representing the first of the new characters, and for linking the character object representing the character following the last of the new characters to the new character object representing the last of the new characters.

An editing command for deleting one or more consecutive characters from the document is mapped by the control module 32 onto database transactions for deleting in the database 34 the character objects representing the characters to be deleted, for linking the character object representing the character preceding the first of the characters to be deleted to the character object representing the character following the last of the characters to be deleted.

An editing command for setting a particular attribute for a specific range or zone of characters in the document is mapped by the control module 32 onto database transactions for storing in the database a zoning object. The zoning object includes an object identifier and information about the particular attribute or a pointer to an attribute object including information about the particular attribute. Moreover, the editing command is mapped by the control module onto database transactions for linking the character objects representing the characters located at the beginning and at the end of the defined zone to the zoning object. The expert will understand that there are various ways of linking the character objects representing the border characters to the zoning object. For example, in the character objects representing the characters located at the beginning and at the end of the defined zone, a zone border identifier is set and the zone border identifier is included as a key in the zoning object. It is also possible to set in the character objects representing the border characters a pointer to the zoning object or a pointer to an object pointing to the zoning object.

Attributes that can be applied to a defined zone of one or more characters of the document include formatting information, access control information, and/or workflow control information. Formatting information includes character attributes such as font, size, or style (e.g. bold, italic, underlined). Access control information includes information about read and/or write access rights of individual users and/or user groups. Workflow control information includes information about users, roles, and workflow phases or steps. Assigning a certain role or workflow phase or step to a document or to a zone makes it possible to make available selectively zones to users or user groups according to a planned workflow. Generally, through application of attributes to zones, various structures, such as XML schemas, layouts, templates, workflows, and/or notes can be applied to defined areas of a document.

In step S10, based on the mapping of the editing command in step S9, a database transaction between the control module 32 and the database 34 is initiated by the control module 32. Depending on the database management system used, locking of data objects in the database (step S11) and/or data integrity checks (step S12) are initiated by the control module 32 or performed automatically by the database 34.

In step S11, character objects that will be affected by the database transactions related to the editing command received in step S8 are locked. For database transactions related to an editing command for inserting or deleting one or more characters, the character objects representing the characters preceding and following the characters to be inserted or deleted are locked. For database transactions related to an editing command for deleting one or more characters, the character objects representing the characters to be deleted are also locked. One skilled in the art will understand that different locking strategies may be applied.

In step S12, in order to determine whether or not the editing command can be executed properly in the database 34, a data integrity check is performed. Based on the information received in step S8 in the editing command, it is checked in step S12 whether or not the character objects representing the characters preceding and following the characters to be inserted have been changed since the insert operation was received from the user in step S6. For delete operations, it is checked in step S12 whether or not the character objects representing the characters to be deleted have been changed since the delete operation was received from the user in step S6.

Based on the data integrity checks performed in step S12, it is decided in step S13 whether or not the editing command can be executed properly in the database 34. If the relevant character objects have been changed since the insert operation was received from the user in step S6, the editing command cannot be executed properly in the database. If the editing command cannot be executed properly in the database 34, a negative confirmation is passed to the control module 32 in step S15. If the editing command can be executed properly in the database 34, the database operations defined in step S9 are executed in step S14, the propagation module 31 is informed about the changes to the database 34 in step S18, and a positive confirmation message is passed to the control module 32 in step S15.

In step S19, the propagation module 31 determines all workstations 1' that have an active session with the document specified in step S3 loaded in the editor module 11' for editing.

In step S20, the propagation module 31 transmits propagation messages via the communication network 2 to the workstations determined in step S19. The propagation messages include the character objects that were changed in the database 34 in step S14 as well as the edit position received in step S8 by the control module 32 in the editing command.

In step S21, the editor modules 11' update their local representation of the document specified in step S3 based on the information received in the propagation message. Particularly, in step S21, the editor modules 11' locate the position where the change is to be applied based on the edit position received in step S20.

In step S22, the editor modules 11' that completed the update in step S21 transmit via the communication network a confirmation message to the propagation module 31.

If a positive confirmation was received in step S15, the changes to each character object, zone object, or attribute object in the database 34 performed in step S14 are logged automatically in the database 34 in step S15'. For each change, the control module 32 automatically stores in the database 34 the user identification of the user requesting the change, time information indicating the time of change, one or more object identifiers of the data objects affected, and information about the type of change. Moreover, the control module 32 logs source information indicating the character object or web page that was used as the source for copied and inserted characters.

In step S15", the control module 32 forwards the confirmation received in step S15 to the editor module 11 via the communication network 2.

In step S16, it is determined whether a positive or a negative confirmation was received in step S15". If a positive confirmation was received and if the editor module 11 is in the synchronous mode, in step S7', the effects of the edit operation received in step S6 are reflected in the local representation of the document and on the display 12 of the workstation 1. If a negative confirmation was received, the user of the workstation is informed in step S17 that the edit operation had to be cancelled due to a collision with another user. If a negative confirmation was received and if the editor module 11 is in the asynchronous mode, additionally in step S17, the effects of the edit operation that were reflected locally in the workstation 1 in step S8' are reversed (roll back).

In conclusion it must be stated that the described system makes not only possible collaborative editing of documents but also management of collaboratively edited documents. In the present system, a log of all executed database transactions is automatically stored. Moreover, the presented system stores automatically additional metadata (e.g. data lineage) about the document at the character level, at the zone level concerning multiple characters, or at the document level. At any point in time, it is possible to recreate from the log any intermediate version of the document. Moreover, based on information stored in the log and based on other metadata, it is possible at any time to show the history of the creation of the document indicating clearly who made what change to the document at what time and what the source of any copied text segment is. The present system also supports knowledge management in that it makes it possible, for example, to find information written by an author not only at the document level but also at the paragraph level. The described system makes it possible to generate knowledge from the metadata about all levels of the document.

The invention claimed is:

1. A computer-based system for collaborative editing of documents, comprising a computer-based control module and a plurality of computerized workstations connected to the control module via communication channels, wherein the system comprises:
   a database connected to the control module,
   wherein the control module is configured for storing a document in the database as a plurality of linked character objects, each character object representing one particular character of the document, each character object including a unique object identifier and a character code representing a type of the particular character, the character object representing the particular character being linked to a first character object representing a character preceding directly the particular character in the document and to a second character object representing a character following directly the particular character in the document,
   wherein the control module is configured to receive and process editing commands from the workstations, editing commands for inserting or deleting characters being mapped by the control module onto database transactions for inserting or deleting character objects in the database and for re-linking in the database the character objects representing characters preceding or following directly inserted or deleted characters, and
   wherein the system comprises a propagation module for transmitting propagation messages to the workstations participating in the collaborative editing of the document, propagation messages including the character objects inserted or deleted in the database.

2. The system according to claim 1, wherein the workstations each include means for storing object identifiers reserved in the database, wherein the workstations each include an editor module configured to display a new character entered by a user, to assign to the new character an object identifier stored in the workstation, and to transmit to the control module an editing command for inserting the new character, the editing command including the object identifier assigned to the new character and the character code representing the type of the new character, and wherein the control module is designed configured to map the editing command for inserting the new character onto a database transaction for inserting into the database a new character object, the new character object including the object identifier and the character code received in the editing command, and for re-linking in the database the character objects representing characters preceding or following directly the new character in the document.

3. The system according to claim 1, wherein the control module is configured to map an editing command for inserting a new character between a preceding character and a subsequent character onto database transactions for inserting a new character object in the database, the new character object being linked to the character object representing the preceding character and to the character object representing the subsequent character, for linking the character object representing the preceding character to the new character object, and for linking the character object representing the subsequent character to the new character object, and wherein the control module is configured to map an editing command for deleting one or more characters between the preceding character and the subsequent character onto database transactions for linking the character object representing the preceding character to the character object representing the subsequent character and for linking the character object representing the subsequent character to the character object representing the preceding character.

4. The system according to claim 1, wherein the system includes means to lock in the database the character objects representing characters preceding and following directly deleted or inserted characters when executing database transactions associated with inserting or deleting characters.

5. The system according to claim 1, wherein the control module is configured to map an editing command for setting a particular attribute for a defined zone of one or more characters of the document onto database transactions for storing in the database a zoning object, the zoning object including the particular attribute or a pointer to an attribute object including the particular attribute, and for linking the character objects representing the characters located at a beginning and at an end of the defined zone to the zoning object.

6. The system according to claim 1, wherein the control module is configured to map an editing command for setting a particular attribute for a defined zone of one or more characters of the document onto database transactions for storing in the database a zoning object, the zoning object including the particular attribute or a pointer to an attribute object including the particular attribute, for setting in the character objects representing the characters located at a beginning and at an end of the defined zone a zone border identifier, and for storing in the database information linking the zone border identifiers to the zoning object.

7. The system according to claim 5, wherein the particular attribute includes at least one of formatting information, access control information, and workflow control information for a defined zone of one or more characters of the document.

8. The system according to claim 1, wherein the workstations each include an editor module for loading from the database the character objects representing the characters of the document, each character object being assigned a position by the editor module, a starting position being assigned to the character object representing a first character of the document and subsequent positions being assigned to the remaining character objects based on links between the character objects, and wherein the editor module is configured to transmit to the control module in response to an editing operation performed by a user an editing command including an editing position, the editing position corresponding to the position assigned to a character object representing a character in the document where the editing operation is applied, wherein the propagation module is configured to include in the propagation messages the editing position received from the editor module, and wherein the editor module is configured to locate the character object where an editing operation is to be applied based on the editing position received in a propagation message.

9. The system according to claim 1, wherein for linking the character objects each character object representing a particular character of the document includes a backward pointer, the backward pointer referencing a character object representing a character preceding directly the particular character in the document, and a forward pointer, the forward pointer referencing a character object representing a character following directly the particular character in the document.

10. The system according claim 1, wherein the editing commands include a user identification, and wherein the control module is configured to store automatically in the database a log of editing commands mapped onto transactions committed to the database, the log including the user identification and time information.

11. A computer program product stored in a memory for editing of documents, the computer program product comprising:
   computer program code means for controlling one or more processors of a computer such
   that the computer stores a document in a database as a plurality of linked character objects, each character object representing one particular character of the document, each character object including a unique object identifier and a character code representing a type of the particular character, the character object representing the particular character being linked to a first character object representing a character preceding directly the particular character in the document and to a second character object representing a character following directly the particular character in the document,
   that the computer receives via communication channels editing commands from more than one workstations connected to the computer for collaborative editing of the document,
   that the computer maps received editing commands for inserting or deleting characters onto database transactions for inserting or deleting character objects in the database and for re-linking in the database the character objects representing characters preceding directly or following inserted or deleted characters, and
   that the computer transmits propagation messages to the workstations participating in the collaborative editing of the document, propagation messages including the character objects inserted or deleted in the database.

12. The computer program product according to claim 11, comprising further computer program code means for controlling the processors of the computer such that the computer receives from one of the workstations a reserve command, that the computer reserves in the database a defined range of object identifiers, that the computer receives from the one workstation an editing command for inserting a new character, the editing command including one of the object identifiers reserved in the database, and that the computer maps the editing command for inserting the new character onto a database transaction for inserting into the database a new character object, the new character object including the object identifier received in the editing command, and for re-linking in the database the character objects representing characters preceding directly or following the new character in the document.

13. The computer program product according to claim 11, comprising further computer program code means for controlling the processors of the computer such that the computer maps an editing command for inserting a new character between a preceding character and a subsequent character onto database transactions for inserting a new character object in the database, the new character object being linked to the character object representing the preceding character and to the character object representing the subsequent character, for linking the character object representing the preceding character to the new character object, and for linking the character object representing the subsequent character to the new character object, and that the computer maps an editing command for deleting one or more characters between the preceding character and the subsequent character onto database transactions for linking the character object representing the preceding character to the character object representing the subsequent character and for linking the character object representing the subsequent character to the character object representing the preceding character.

14. The computer program product according to claim 11, comprising further computer program code means for controlling the processors of the computer such that the computer locks in the database the character objects representing characters preceding directly and following deleted or inserted characters when executing database transactions associated with inserting or deleting characters.

15. The computer program product according to claim 11, comprising further computer program code means for controlling the processors of the computer such that the computer maps an editing command for setting a particular attribute for a defined zone of one or more characters of the document onto database transactions for storing in the database a zoning object, the zoning object including the particular attribute or a pointer to an attribute object including the particular attribute, and for linking the character objects representing the characters located at the beginning and at the end of the defined zone to the zoning object.

16. The computer program product according to claim 11, comprising further computer program code means for controlling the processors of the computer such that the computer maps an editing command for setting a particular attribute for a defined zone of one or more characters of the document onto database transactions for storing in the database a zoning object, the zoning object including the particular attribute or a pointer to an attribute object including the particular attribute, for setting in the character objects representing the characters located at the beginning and at the end of the defined zone a zone border identifier, and for storing in the database information linking the zone border identifiers to the zoning object.

17. The computer program product according to claim 11, comprising further computer program code means for controlling the processors of the computer such that the computer receives from the workstations editing commands including an editing position, the editing position corresponding to a position in the document where an editing operation is applied, and that the computer includes in the propagation messages the editing positions received in the editing commands.

18. The computer program product according to claim 11, comprising further computer program code means for controlling the processors of the computer such that the computer includes, for linking the character objects, in each character object representing a particular character of the document a backward pointer, the backward pointer referencing a character object representing a character preceding directly the particular character in the document, and a forward pointer, the forward pointer referencing a character object representing a character following directly the particular character in the document.

19. The computer program product according to claim 11, comprising further computer program code means for controlling the processors of the computer such that the computer receives from the workstations editing commands including a user identification, and that the computer stores in the database a log of editing commands mapped onto transactions committed to the database, the log including the user identification and time information.

20. A method for collaborative editing of documents, comprising:

storing a document in a database coupled to a control module as a plurality of linked character objects, each character object representing one particular character of the document, each character object including a unique object identifier and a character code representing a type of the particular character, the character object representing the particular character being linked to a first character object representing a character preceding directly the particular character in the document and to a second character object representing a character following directly the particular character in the document, receiving and processing editing commands from workstations, editing commands for inserting or deleting characters being mapped by the control module onto database transactions for inserting or deleting character objects in the database and for re-linking in the database the character objects representing characters preceding or following directly inserted or deleted characters, and transmitting propagation messages from a propagation module to the workstations participating in the collaborative editing of the document, wherein the propagation messages include the character objects inserted or deleted in the database.

\* \* \* \* \*